(12) United States Patent
Yamashita et al.

(10) Patent No.: US 9,658,813 B2
(45) Date of Patent: May 23, 2017

(54) INFORMATION PROCESSING DEVICE, INFORMATION PROCESSING SYSTEM, INFORMATION PROCESSING METHOD, AND STORAGE MEDIUM

(71) Applicant: FUJI XEROX CO., LTD., Minato-ku, Tokyo (JP)

(72) Inventors: Hiroyuki Yamashita, Kanagawa (JP); Kohshiro Inomata, Kanagawa (JP); Masayuki Yamaguchi, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 257 days.

(21) Appl. No.: 14/192,383

(22) Filed: Feb. 27, 2014

(65) Prior Publication Data

US 2015/0058476 A1    Feb. 26, 2015

(30) Foreign Application Priority Data

Aug. 21, 2013  (JP) ................................ 2013-171204

(51) Int. Cl.
*G06F 3/12*    (2006.01)
*H04L 29/08*   (2006.01)
(Continued)

(52) U.S. Cl.
CPC .......... *G06F 3/1287* (2013.01); *G06F 3/1203* (2013.01); *G06F 3/1213* (2013.01);
(Continued)

(58) Field of Classification Search
CPC ...... G06F 3/1287; G06F 3/121; G06F 3/1203; H04L 67/125
(Continued)

(56) References Cited

U.S. PATENT DOCUMENTS

2006/0195580 A1   8/2006  Chou et al.
2006/0227363 A1*  10/2006 Ogura ................... G06F 3/1261
                                                358/1.15
(Continued)

FOREIGN PATENT DOCUMENTS

JP    2004-040228 A    2/2004
JP    2006-108935 A    4/2006
(Continued)

OTHER PUBLICATIONS

Communication dated Jan. 19, 2016 from the Japanese Patent Office issued on corresponding Application No. 2013-171204.
(Continued)

*Primary Examiner* — Farzana Huq
*Assistant Examiner* — Zi Ye
(74) *Attorney, Agent, or Firm* — Sughrue Mion, PLLC (57) ABSTRACT

An information processing device includes a communication unit that makes communication with a plurality of service providing devices; a receiving unit that receives information relating to use of a function, which is provided by the information processing device, from one service providing device among the plurality of service providing devices; and a notification unit that notifies the other service providing device about a state of the information processing device through the communication unit in response to the reception of the information by the receiving unit.

16 Claims, 6 Drawing Sheets

(51) Int. Cl.
*G06F 15/173* (2006.01)
*H04N 1/00* (2006.01)

(52) U.S. Cl.
CPC .......... *G06F 3/1271* (2013.01); *G06F 3/1275* (2013.01); *H04L 67/125* (2013.01); *H04N 1/00* (2013.01)

(58) Field of Classification Search
USPC .................. 709/224; 358/402, 1.15, 1.14
See application file for complete search history.

(56) References Cited

U.S. PATENT DOCUMENTS

| | | | | |
|---|---|---|---|---|
| 2008/0030750 A1* | 2/2008 | Kato | ...................... | G03G 21/02 358/1.4 |
| 2009/0063663 A1 | 3/2009 | Ikeno | | |
| 2010/0165376 A1* | 7/2010 | Matsuyama | .......... | G06F 3/1215 358/1.14 |
| 2011/0063665 A1* | 3/2011 | Hirakawa | ............... | G06F 3/121 358/1.15 |
| 2013/0163027 A1* | 6/2013 | Shustef | ............... | H04L 63/0209 358/1.14 |

FOREIGN PATENT DOCUMENTS

| JP | 2006-178767 A | 7/2006 |
|---|---|---|
| JP | 2006-236137 A | 9/2006 |
| JP | 2009-059218 A | 3/2009 |

OTHER PUBLICATIONS

Communication, dated Jun. 28, 2016, from the Japanese Patent Office in counterpart Japanese application No. 2013-171204.

* cited by examiner

INFORMATION PROCESSING DEVICE, INFORMATION PROCESSING SYSTEM, INFORMATION PROCESSING METHOD, AND STORAGE MEDIUM

CROSS-REFERENCE TO RELATED APPLICATIONS

This application is based on and claims priority under 35 USC 119 from Japanese Patent Application No. 2013-171204 filed Aug. 21, 2013.

BACKGROUND (i) Technical Field

The present invention relates to an information processing device, an information processing system, an information processing method, and a storage medium.

(ii) Related Art

A cloud service is known, in which a server device executes various information processing, such as storage of data or conversion of the data format, instead of a client device.

SUMMARY

According to an aspect of the invention, there is provided an information processing device including a communication unit that makes communication with a plurality of service providing devices; a receiving unit that receives information relating to use of a function, which is provided by the information processing device, from one service providing device among the plurality of service providing devices; and a notification unit that notifies the other service providing device about a state of the information processing device through the communication unit in response to the reception of the information by the receiving unit.

BRIEF DESCRIPTION OF THE DRAWINGS

An exemplary embodiment of the present invention will be described in detail based on the following figures, wherein.

DETAILED DESCRIPTION

Figure 1:
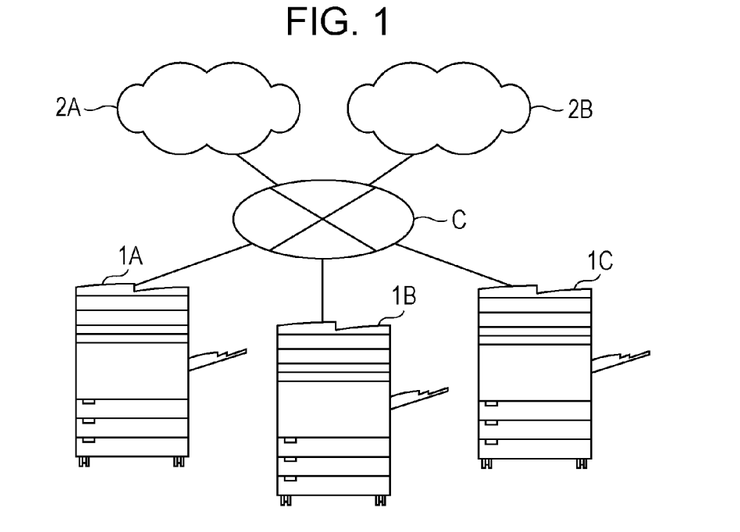
FIG. 1 is an illustration explaining a general configuration of an image processing system.

FIG. 1 is an illustration explaining a general configuration of an image processing system (an example of an information processing system) according to an exemplary embodiment of the invention. The image processing system executes various information processing relating to image data (for example, storage of image data and conversion of the format of the image data). The image processing system includes plural image processing devices 1 (1A, 1B, and 1C) and plural service providing devices 2 (2A and 2B). Each image processing device 1 functions as, for example, a copier, a printer, a scanner, and a facsimile. Each service providing device 2 is a server device that provides a service. In the exemplary embodiment of the invention, a service having a combination of at least one function is provided. In this exemplary embodiment, the service providing device 2 provides a cloud service as an example of a service. The cloud service provides a computer resource that executes various information processing, such as storage of data or conversion of the data format, through a communication line. The service providing device 2 executes various information processing relating to image data instead of the image processing device 1. The service providing devices 2A and 2B provide different services. The image processing devices 1 and the service providing devices 2 are connected to each other through a communication line C such as the Internet. In the image processing system, a user inputs an instruction for using a cloud service by operating one of the image processing devices 1. In the following description, the image processing device 1, to which an instruction for using a cloud service is input, is expressed as "input device." In the input device, for example, a scan function of the image processing device 1 is used. Also, in the following description, the image processing device 1 that outputs image data after image processing is executed by a cloud service is expressed as "output device." In the output device, for example, a print function of the image processing device 1 is used. The input device and the output device may not be physically the same image processing device 1. For example, the input device may be the image processing device 1A, and the output device may be the image processing device 1B. The serving providing device 2 has previously registered therein the input device and the output device for the use of a cloud service. The use of the image processing device 1 is not limited to the use as the input device or the output device. The image processing device 1 may be used by the service providing device 2, as an intermediate device that executes only data processing or image processing regardless of input or output.

Figure 2:
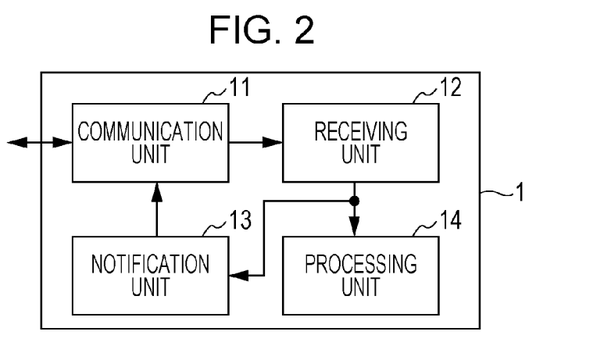
FIG. 2 is a block diagram showing a functional configuration of an image processing device.

FIG. 2 is a block diagram showing a functional configuration of the image processing device 1. The image processing device 1 includes a communication unit 11, a receiving unit 12, a notification unit 13, and a processing unit 14. The communication unit 11 makes communication with the plural service providing devices 2. The receiving unit 12 receives information from one service providing device 2 among the plural service providing devices 2, the information relating to the use (for example, a reservation for the use) of a function provided by the image processing device 1 (for example, a function of printing, scanning, or faxing). When the receiving unit 12 receives the information relating to use, the notification unit 13 notifies the service providing device 2 about the state of the image processing device 1 through the communication unit 11. When the information relating to use is received from the one service providing device 2 among the plural service providing devices 2, the notification unit 13 notifies the other service providing device 2, which is different from the one service providing device 2, about the state of the image processing device 1. The processing unit 14 executes processing corresponding to the information received by the receiving unit 12.

Figure 3:
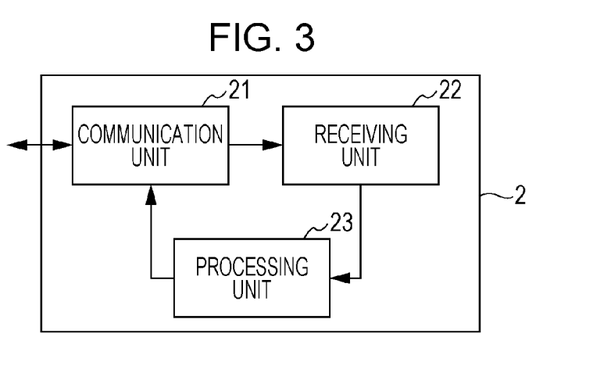
FIG. 3 is a block diagram showing a functional configuration of a service providing device.

FIG. 3 is a block diagram showing a functional configuration of the service providing device 2. The service providing device 2 includes a communication unit 21, a receiving unit 22, and a processing unit 23. The communication unit 21 makes communication with the image processing device 1. The receiving unit 22 receives information indicative of the state of the image processing device 1 through the communication unit 21. The processing unit 23 executes processing corresponding to the information received by the receiving unit 22.

Figure 4:
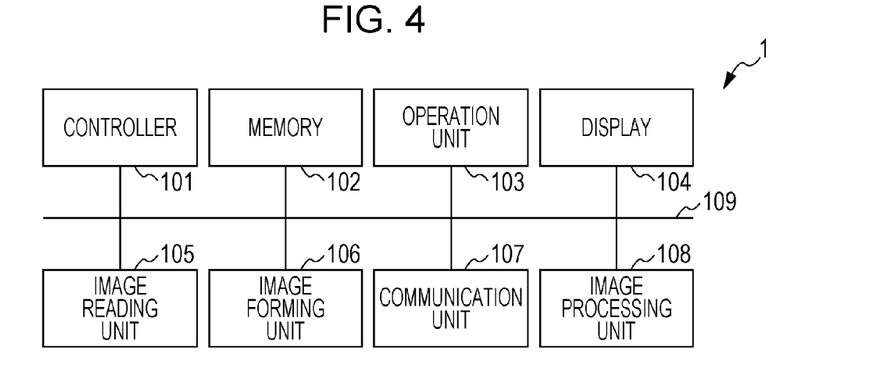
FIG. 4 is a block diagram showing a hardware configuration of the image processing device.

FIG. 4 is a block diagram showing a hardware configuration of the image processing device 1. As shown in FIG. 4, the image processing device 1 includes a controller 101, a memory 102, an operation unit 103, a display 104, an image reading unit 105, an image forming unit 106, a communication unit 107, and an image processing unit 108. Also, the respective units of the image processing device 1 are connected to a bus 109, and send and receive various data through the bus 109.

The controller 101 controls operation of the respective units of the image processing device 1. The controller 101 includes an arithmetic processing unit such as a central processing unit (CPU), and a storage medium (a main memory) such as a read only memory (ROM) or a random access memory (RAM). The CPU reads a control program stored in the ROM, and executes the control program while using the RAM as a work area. The controller 101 allows, for example, an image to be formed on a sheet, a document to be read and image data of the document to be generated, and communication to be made with other devices through the communication line C, by executing the control program.

The memory 102 stores data. The memory 102 includes a storage medium (an auxiliary memory), such as a hard disk or a flash memory, and stores, for example, data received by the communication unit 107 and data generated by the image processing device 1. Also, the memory 102 may include a removable storage medium (a removable media), such as a memory card or a universal serial bus (USB) memory, and a unit that reads and writes data from and in the storage medium.

The operation unit 103 receives an operation by a user. The operation unit 103 includes an operator (a button, a key, etc.), and supplies a control signal corresponding to the pressed operator to the controller 101. Also, the operation unit 103 may include the display 104 and a sensor overlaid on a display surface of the display 104, and thus the operation unit 103 may be formed of a touch panel that supplies a control signal corresponding to the pressed position to the controller 101.

The display 104 displays information. The display 104 may use, for example, a liquid crystal display as a display device. The display 104 displays a menu screen for operating the image processing device 1 and data relating to the image processing device 1 under control by the controller 101.

The image reading unit 105 reads a document and converts the document into image data. The image reading unit 105 includes an image reading device that optically reads a document and generates image data, which represents an image of the read document. The image reading unit 105 supplies the generated image data to the image processing unit 108.

The image forming unit 106 forms an image. The image forming unit 106 includes an image forming mechanism that forms a toner image on a recording medium such as paper by using an electrophotographic system. The recording system used by the image forming mechanism is not limited to the electrophotographic system, and may be other recoding system such as an inkjet system.

The communication unit 107 sends and receives data. The communication unit 107 is connected to the communication line C, and functions as a communication interface that makes communication with other devices connected to the communication line C.

The image processing unit 108 executes image processing on image data. In this case, the image processing is, for example, color correction and gray-scale correction. The image processing unit 108 supplies the image data after the image processing is executed, to the image forming unit 106.

In FIG. 4, the controller 101 is an example of the receiving unit 12, the notification unit 13, and the processing unit 14. The communication unit 107 controlled by the controller 101 is an example of the communication unit 11. When the hardware configurations of the respective image processing devices 1 shown in FIG. 1 are distinguished from each other, the alphabets of the reference signs of the image processing devices 1 are added to the ends of the reference signs of the respective hardware configurations. For example, the controller 101 of the image processing device 1A is expressed as "controller 101A," and the controller 101 of the image processing device 1B is expressed as "controller 101B."

Figure 5:
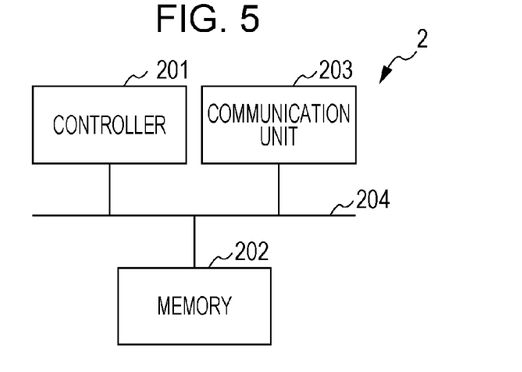
FIG. 5 is a block diagram showing a hardware configuration of the service providing device.

FIG. 5 is a block diagram showing a hardware configuration of the service providing device 2. As shown in FIG. 5, the service providing device 2 is a computer including a controller 201, a memory 202, and a communication unit 203. Also, the respective units of the service providing device 2 are connected to a bus 204, and send and receive various data through the bus 204.

The controller 201 controls operation of the respective units of the service providing device 2. The controller 201 includes an arithmetic processing unit such as a CPU, and a storage medium (a main memory) such as a ROM or a RAM. The memory 202 stores data. The memory 202 includes a storage medium (an auxiliary memory) such as a hard disk or a flash memory, and stores data received by the communication unit 203. The communication unit 203 sends and receives data. The communication unit 203 is connected to the communication line C, and functions as a communication interface that makes communication with other devices connected to the communication line C. In FIG. 5, the controller 201 is an example of the receiving unit 22 and the processing unit 23. The communication unit 203 controlled by the controller 201 is an example of the communication unit 21. Alternatively, the service providing device 2 may not be a single physical computer, and may be formed of a combination of plural computers. Still alternatively, the service providing device 2 may be a virtual server virtually provided in a computer by using a virtualization technology. For example, the service providing devices 2A and 2B may be provided as different virtual serves provided in a single computer. When the hardware configurations of the respective service providing devices 2 shown in FIG. 1 are distinguished from each other, the alphabets of the reference signs of the service providing devices 2 are added to the ends of the reference signs of the respective hardware configurations. For example, the controller 201 of the service providing device 2A is expressed as "controller 201A," and the controller 201 of the service providing device 2B is expressed as "controller 201B."

Figure 6:
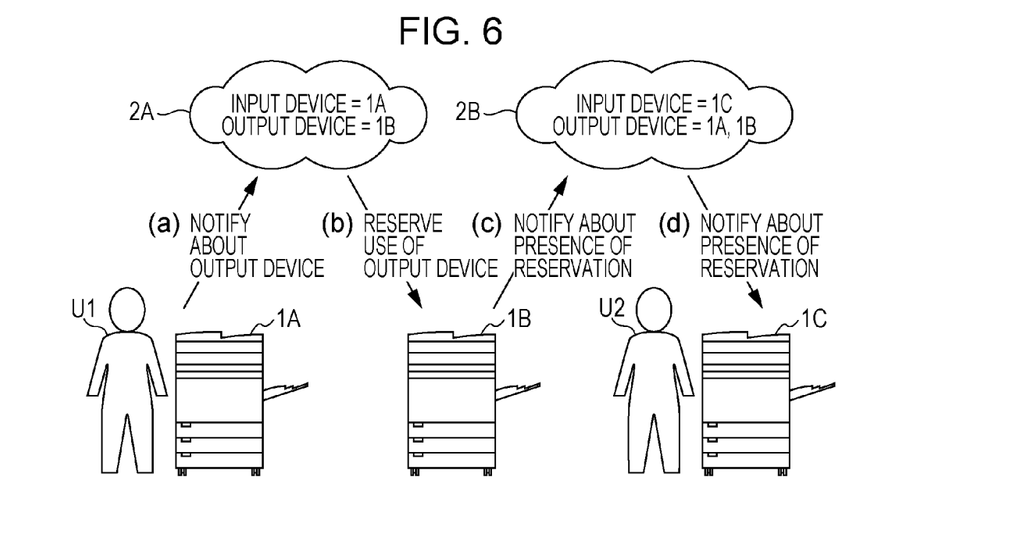
FIG. 6 is an illustration showing an example of an overview of processing executed by the image processing system.

FIG. 6 is an illustration showing an example of an overview of processing executed by the image processing system. In FIG. 6, the illustration of the communication line C is omitted for the convenience of description. In the example shown in FIG. 6, the image processing device 1 receives a reservation for the use of a function that is provided by the image processing device 1 (hereinafter, merely referred to as "reservation"). FIG. 6 shows an input device and an output device for each service providing device 2. The input device and the output device are registered in a cloud service that is provided by the service providing device 2. In this example, the input device and the output device are individually registered in the cloud service. That is, the image processing device 1 is registered in the cloud service for each function of the image processing device 1 used in the cloud service. In the service providing device 2A, the image processing device 1A is registered as the input device, and the image processing device 1B is registered as the output device. In the service providing device 2B, the image processing device 1C is registered as the input device, and the image processing devices 1A and 1B are registered as the output devices. The image processing device 1 may be registered in plural service providing devices 2 or may be registered as the input device and the output device in a single service providing device 2. Also, plural image processing devices 1 may be registered in the service providing devices 2, as the input devices or the output devices. When a user starts the use of a cloud service, the user operates one of the image processing devices 1 registered as the input devices. Also, the user operates the input device to select one image processing device 1 from among the image processing devices 1 registered as the output devices. The output device may be selected, for example, by operating a selection screen displayed on the display 104. In this case, the image processing device 1 uses a web browser or the like to receive data indicative of the selection screen from the service providing device 2. The selection screen includes information indicative of the presence or absence of a reservation (hereinafter, referred to as "reservation information") for the image processing device 1 registered as the output device. The reservation information may indicate enable or disable of the use of the image processing device 1, instead of the presence or absence of a reservation.

FIG. 6 shows processing that is executed when a user U1 uses the image processing device 1A as the input device and starts the use of a cloud service provided by the service providing device 2A (hereinafter, referred to as "service A"). To be specific, FIG. 6 shows processing when the user U1 selects the image processing device 1B as the output device and starts the use of the service A. When the user U1 selects the output device, the image processing device 1A notifies the service providing device 2A about the selected output device ((a) in FIG. 6). When the service providing device 2A receives the notification about the selected output device, the service providing device 2A reserves the use of the output device (in this case, the image processing device 1B) ((b) in FIG. 6). When the image processing device 1B receives the reservation, the image processing device 1B notifies the other service providing device 2, which is different from the service providing device 2, through which the reservation is received, about the presence of the reservation (an example of the state of the image processing device 1) ((c) in FIG. 6). In this example, the image processing device 1B notifies the service providing device 2B about the presence of the reservation.

FIG. 6 also shows processing that is executed when a user U2 uses the image processing device 1C as the input device and starts the use of a cloud service provided by the service providing device 2B (hereinafter, referred to as "service B"). FIG. 6 shows processing when the user U2 starts the use of the service B after the user U1 starts the use of the service A (after the image processing device 1B notifies the service providing device 2B about the presence of the reservation). When the user U2 inputs an instruction for starting the use of the service B, the service providing device 2B notifies the image processing device 1C about the presence of the reservation for the use of the image processing device 1B registered as the output device ((d) in FIG. 6). When the notification of (d) in FIG. 6 is made, the selection screen displayed on the display 104C of the image processing device 1C includes information indicative of the presence of the reservation for the use of the image processing device 1B.

Figure 7:
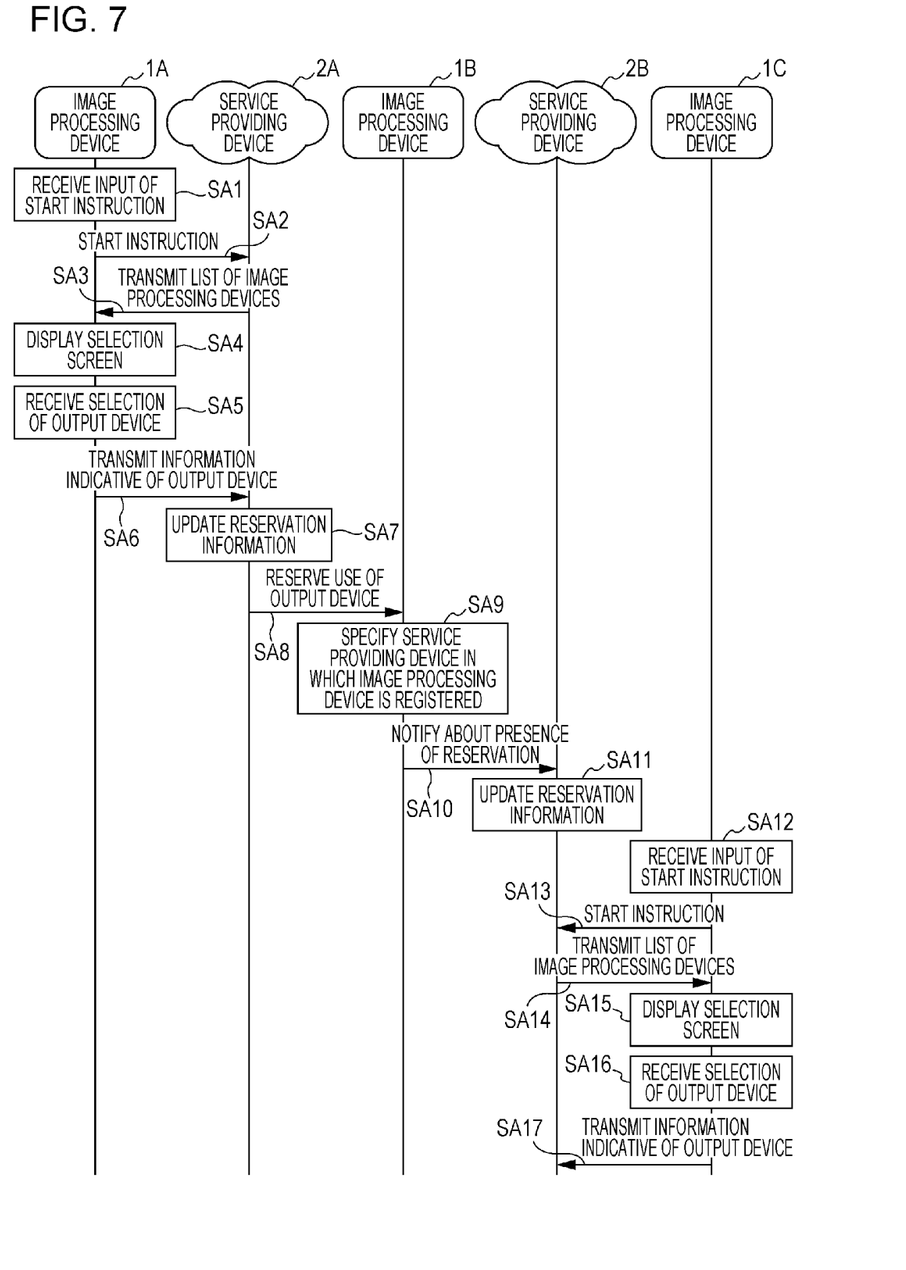
FIG. 7 is a sequence chart showing an example of processing executed by the image processing system.

FIG. 7 is a sequence chart showing an example of processing executed by the image processing system. Referring to FIG. 7, description is given for an example in which processing corresponding to the processing exemplarily shown in FIG. 6 is executed. Step SA1 to step SA11 indicate processing when the user U1 starts the use of the service A. In step SA1, the controller 101A of the image processing device 1A receives input of an instruction for starting the use of a cloud service (hereinafter, referred to as "start instruction"). The input of the start instruction is received when the user U1 operates an operation unit 103A. In the example shown in FIG. 7, the user U1 inputs the start instruction for the service A. In step SA2, the controller 101A transmits the start instruction to the service providing device 2A. In step SA3, the controller 201A of the service providing device 2A transmits a list of the image processing devices 1 registered as the output devices to the image processing device 1A. The list of the output devices includes reservation information for each of the image processing devices 1. The reservation information is stored in the RAM of each of the service providing devices 2. It is to be noted that the reservation information for each of the image processing devices 1 is set to have no reservation in an initial state.

In step SA4, the controller 101A displays a selection screen. To be specific, the controller 101A displays the selection screen on the display 104A based on the list of the output devices received from the service providing device 2A. The selection screen includes the reservation information for each of the image processing devices 1. In step SA5, the controller 101A receives selection of an output device. The selection of the output device is received when the user U1 selects an image processing device 1 included in the selection screen.

Figure 8:
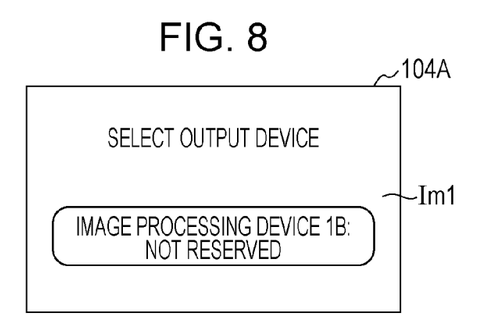
FIG. 8 is an illustration showing an example of a selection screen.

FIG. 8 is an illustration showing an example of a selection screen displayed in step SA4. In this example, a selection screen Im1 includes a message that urges the user U1 to select an output device. The selection screen Im1 includes a button indicative of the image processing device 1B as the image processing device 1 registered as the output device in the service providing device 2A. The selection screen Im1 includes reservation information indicative of the absence of a reservation for the use of the image processing device 1B. The user U1 selects the image processing device 1B as the output device by pressing the button indicative of the image processing device 1B.

Now FIG. 7 is referenced again. In step SA6, the controller 101A transmits the information indicative of the selected output device to the service providing device 2A. In step SA7, the controller 201A updates the reservation information stored in the RAM. To be specific, the controller 201A rewrites the reservation information of the image processing device 1 selected as the output device (in this case, the image processing device 1B) to the presence of the reservation. In step SA8, the controller 201A reserves the use of the selected output device. To be specific, the controller 201A transmits information indicative of the service providing device 2 of a reservation source, and information indicative of that the use of a function provided by the output device is reserved, to the image processing device 1B, and thus reserves the use of the image processing device 1B.

In step SA9, the controller 101B of the image processing device 1B specifies the service providing device 2 in which the image processing device 1B is registered. To be specific, each of the image processing devices 1 is previously stored in the memory 102 information indicative of the service providing devices 2 in which the image processing device 1 is registered (hereinafter, referred to as "registration information"). The registration information indicates, for example, the uniform resource locators (URLs) of the service providing devices 2 in which the image processing device 1 is registered. The controller 101B specifies the service providing devices 2 in which the image processing device 1B is registered based on the registration information stored in the memory 102. In step SA10, the controller 101B notifies the other service providing device 2 other than the service providing device 2 of the reservation source (in this case, the service providing device 2A) among the service providing devices 2 in which the image processing device 1B is registered, about the presence of the reservation for the use of the image processing device 1B. To be specific, the controller 101B transmits information indicative of the image processing device 1 of a notification source and information indicative of the presence of the reservation to the service providing device 2B, and thus notifies the service providing device 2B about the presence of the reservation for the use of the image processing device 1B.

In step SA11, the controller 201B of the service providing device 2B updates the reservation information stored in the RAM. To be specific, the controller 201B rewrites the reservation information of the notification source, which makes the notification about the presence of the reservation, to the presence of the reservation. As indicated in step SA1 to step SA11, when the image processing device 1 receives a reservation for use from one service providing device 2, the image processing device 1 notifies the other service providing device 2 about the presence of the reservation. Thus, the reservation information for the image processing device 1, the reservation of which is received, is shared by the different service providing device 2.

Step SA12 to step SA17 indicate processing when the user U2 starts the use of the service B. In step SA12 to step SA17, the controller 101C of the image processing device 1C and the controller 201B of the service providing device 2B execute processing similar to the processing from step SA1 to step SA6. In step SA12, input of a start instruction is received when the user U2 operates the operation unit 103C of the image processing device 1C. In the example shown in FIG. 7, the user U2 inputs the start instruction for the service B. In step SA13, the controller 101C transmits the start instruction to the service providing device 2B. In step SA14, the controller 201B transmits a list of the image processing devices 1 registered as the output devices to the image processing device 1C. At this time, the use of the image processing device 1A is not reserved, and the use of the image processing device 1B is reserved by the user U1. Hence, the controller 201B transmits the list indicative of that the use of the image processing device 1A is not reserved and the use of the image processing device 1B is reserved. In step SA15, the controller 101C displays a selection screen. In step SA16, the controller 101C receives selection of an output device.

Figure 9:
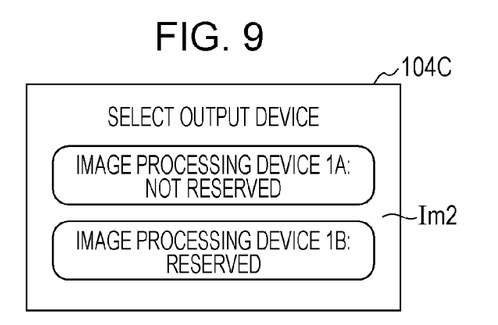
FIG. 9 is an illustration showing an example of a selection screen.

FIG. 9 is an illustration showing an example of a selection screen displayed in step SA15. A selection screen Im2 includes buttons indicative of the image processing devices 1A and 1B as the image processing devices 1 registered as the output devices in the service providing device 2B. The selection screen Im2 includes reservation information indicative of the absence of the reservation for the use of the image processing device 1A and the presence of the reservation for the use of the image processing device 1B. The user U2 selects the image processing device 1 to be operated as the output device based on the reservation information included in the selection screen Im2. It is to be noted that the selection screen may display that the image processing device 1A is available for use and the image processing device 1B is not available for use.

Now FIG. 7 is referenced again. In step SA17, the controller 101C transmits the information indicative of the selected output device to the service providing device 2B. After the processing in step SA17 is executed, processing similar to the processing in step SA7 to step SA11 is executed. With the above-described processing, the selection screen when the use of a cloud service is started also displays the presence or absence of the reservation for the use of the other cloud service.

The invention is not limited to the above-described exemplary embodiment, and various modifications may be made. Some modifications are described below. When the modifications described below are implemented, at least two modifications may be combined.

(1) First Modification

A configuration that reserves the use of the image processing device 1 is not limited to the service providing device 2. The image processing device 1 may receive a reservation for use from, for example, an external device, such as a personal computer, which is connected through a local-area network (LAN). In this case, the image processing device 1, which receives the reservation, may notify the service providing devices 2, in which the image processing device 1 is registered, about the presence of the reservation.

(2) Second Modification

The service provided by the service providing device 2 is not limited to the cloud service. The service providing device 2 may provide an on-premises server service or a print service.

(3) Third Modification

The state of the image processing device 1 notified by the image processing device 1 is not limited to the presence of the reservation for the use of the image processing device 1. The image processing device 1 may notify the service providing device 2, for example, about that the use of the image processing device 1 is started, in addition to the notification about the presence of the reservation for the use of the image processing device 1. For another example, the image processing device 1 may notify the service providing device 2 about that the use of the image processing device 1 is ended, in addition to the notification about the presence of the reservation for the use of the image processing device 1. In this case, the image processing device 1 specifies the service providing device 2, in which the image processing device 1 is registered, based on the registration information stored in the memory 102, and notifies the service providing device 2 about the end of the use of the image processing device 1. Then, the controller 201 of the service providing device 2, which receives the notification, updates the reservation information stored in the RAM. To be specific, the controller 201 rewrites the reservation information of the notification source, which makes the notification about the end of the use of the image processing device 1, to the absence of the reservation.

(4) Fourth Modification

The information, which is notified by the image processing device 1 to the service providing device 2, is not limited to the state of the image processing device 1. In a case in which one service providing device 2 reserves the use of the image processing device 1, the image processing device 1 may notify the other service providing device 2 about the progress of processing in the cloud service of the one service providing device 2.

Figure 10:
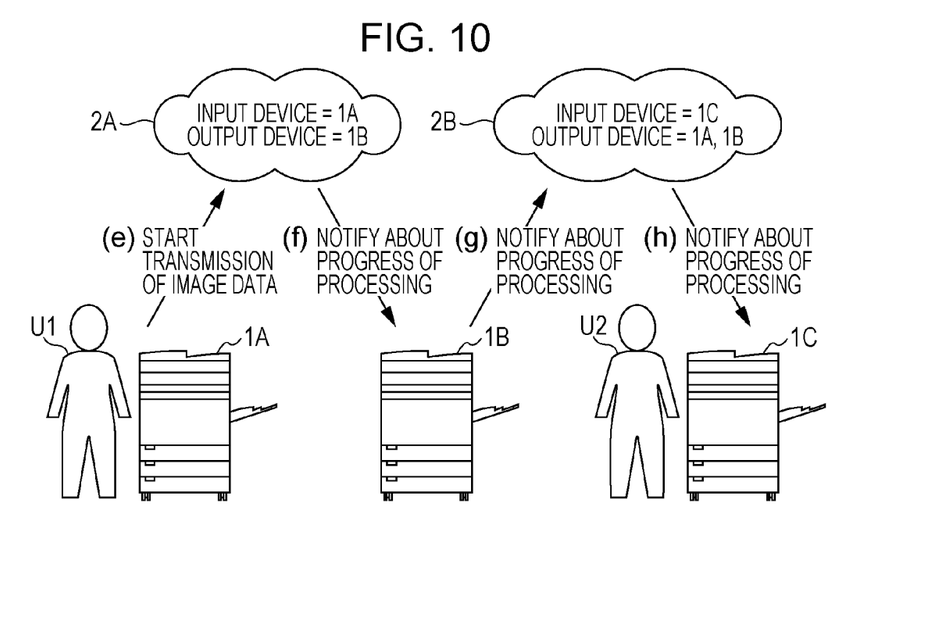
FIG. 10 is an illustration showing an example of processing according to a fourth modification.

FIG. 10 is an illustration showing an example of processing according to a fourth modification. In the example shown in FIG. 10, the image processing device 1B notifies the service providing device 2B about that the service providing device 2A, through which the use of the image processing device 1B is reserved, starts acquisition of image data. FIG. 10 shows processing when the user U1 starts the use of the service A. When the use of the service A is started, the image processing device 1A starts transmission of image data to the service providing device 2A ((e) in FIG. 10). When the service providing device 2A starts the acquisition of the image data, the service providing device 2A notifies the image processing device 1B about that the acquisition of the image data is started as the progress of the processing ((f) in FIG. 10). When the image processing device 1B receives the notification about the progress of the processing, the image processing device 1B notifies the service providing device 2B about the progress of the processing ((g) in FIG. 10). Alternatively, the image processing device 1B may receive the notification about the progress of the processing from the image processing device 1A. Also, in the example shown in FIG. 10, the service providing device 2B may notify the image processing device 1C about the progress of the processing ((h) in FIG. 10). In this case, the image processing device 1C, which receives the notification, may display that the service providing device 2A starts the acquisition of the image data, on the display 104C.

Figure 11:
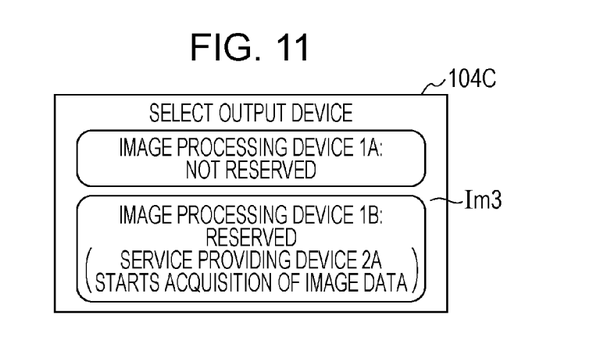
FIG. 11 is an illustration showing an example of displaying indicative of that acquisition of image data is started.

FIG. 11 is an illustration showing an example when the display 104C displays that the service providing device 2A starts acquisition of image data. FIG. 11 shows an example when the selection screen Im2 shown in FIG. 9 is updated and a selection screen Im3 is displayed. In FIG. 11, in the selection screen Im3, a message indicative of that the service providing device 2A starts the acquisition of the image data is added to the reservation information.

It is to be noted that the progress of processing of one service providing device 2, which is notified to the other service providing device 2, is not limited to that the acquisition of the image data is started. For example, if processing in a cloud service of one service providing device 2 is divided into plural steps, a state, in which the processing is ended, to a predetermined step among the plural steps may be notified to the other service providing device 2. For another example, the ratio of processing which is ended with respect to the entire processing in a cloud service may be notified to the other service providing device 2.

(5) Fifth Modification

When the image processing device 1 receives a reservation for the use of a function provided by the image processing device 1, the image processing device 1 may receive a reservation for the use of any function of plural functions provided by the image processing device 1. That is, the image processing device 1 may receive a reservation for the use of each function. In this case, the image processing device 1 may notify the service providing device 2 about the presence of the reservation for the function, the reservation for the use of which is received. For example, when the image processing device 1 receives a reservation for the use of a print function from a service providing device 2, the image processing device 1 may notify the other service providing device 2 about the presence of the reservation for the print function.

(6) Sixth Modification

The service providing device 2, which is notified of the state of the image processing device 1 by the image processing device 1, is not limited to all service providing devices 2 in which the image processing device 1 is registered. The image processing device 1 may notify part of the service providing devices 2, in which the image processing device 1 is registered, about the state of the image processing device 1.

Figure 12:
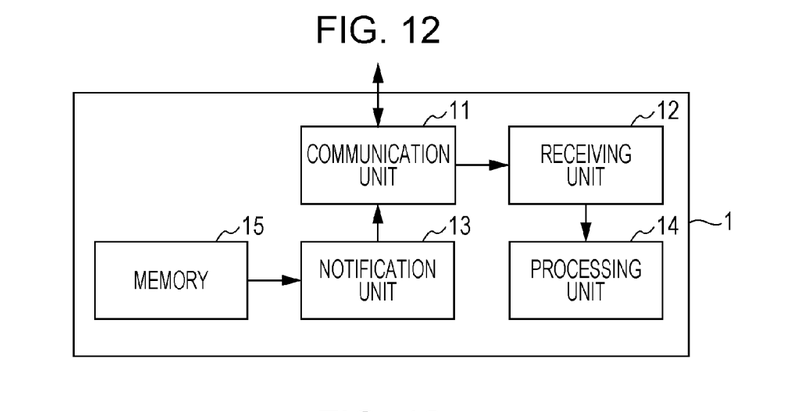
FIG. 12 is a block diagram showing a functional configuration of an image processing device according to a sixth modification.

FIG. 12 is a block diagram showing a functional configuration of an image processing device 1 according to a sixth modification. In FIG. 12, the image processing device 1 includes a memory 15 in addition to the functional configuration of the image processing device 1 shown in FIG. 2. The memory 15 stores each of plural functions provided by the image processing device 1 and the service providing device 2 of a notification target in an associated manner. For example, the memory 15 stores the service providing device 2 that provides a cloud service, in which each of plural functions of the image processing device 1 is registered, in association with the function. In the sixth modification, the notification unit 13 notifies the service providing device 2 corresponding to the function, the reservation for the use of which is received by the receiving unit 12, about the state of the image processing device 1 based on the information stored in the memory 15. In the sixth modification, the memory 102 controlled by the controller 101 is an example of the memory 15.

Figure 13:
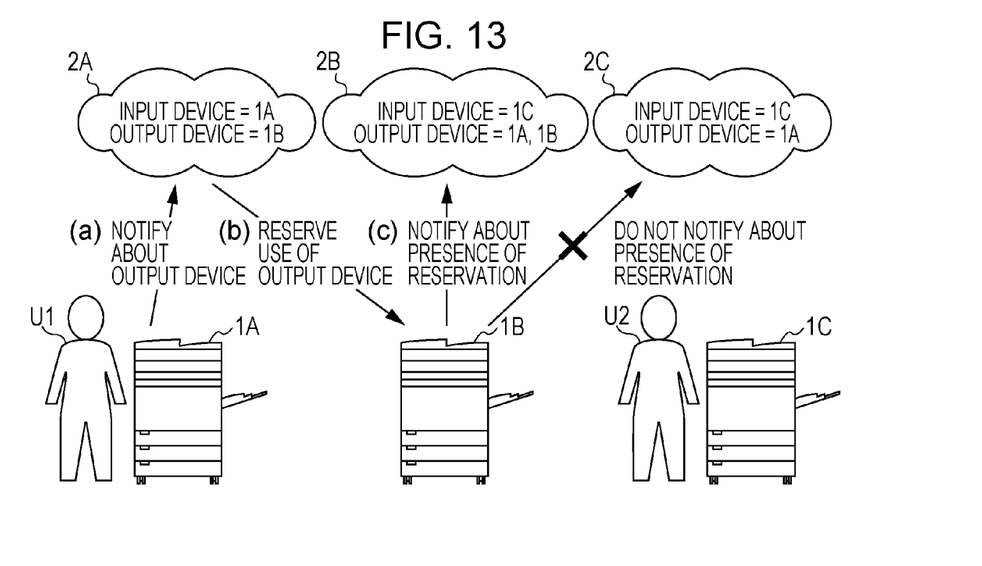
FIG. 13 is an illustration showing an example of processing according to the sixth modification.

FIG. 13 is an illustration showing an example of processing according to the sixth modification. In the example shown in FIG. 13, the image processing device 1 notifies the service providing device 2 that provides the cloud service having registered therein the function of the image processing device 1, the reservation for the use of which is received, about the state of the image processing device 1. In FIG. 13, a service providing device 2C is used in addition to the above-described service providing devices 2A and 2B. The service providing device 2C has a functional configuration and a hardware configuration similar to those of the service providing devices 2A and 2B, and provides a service different from those of the service providing devices 2A and 2B. In the service providing device 2C, the image processing device 1C is registered as the input device, and the image processing device 1A is registered as the output device. In this state, if the user U1 uses the image processing device 1A as the input device, selects the image processing device 1B as the output device, and starts the use of the service A, the image processing device 1B notifies the service providing device 2B corresponding to the print function of the image processing device 1B (that is, the service providing device 2B in which the print function of the image processing device 1B is registered) about the presence of the reservation for the use of the image processing device 1B. In contrast, the image processing device 1B does not notify the service providing device 2C not corresponding to the print function of the image processing device 1B (that is, the service providing device 2C in which the print function of the image processing device 1B is not registered) about the presence of the reservation for the use of the image processing device 1B.

(7) Seventh Modification

The situation in which the image processing device 1 notifies the service providing device 2 about the presence of the reservation for the use of the image processing device 1 is not limited to all situations when a reservation for use is received. For example, if an expected period of time for processing in a cloud service of the service providing device 2, through which the reservation is received, is a predetermined threshold or shorter, the image processing device 1 may not notify the other service providing device 2 about the presence of the reservation for the use of the image processing device 1. The expected period of time for processing in the cloud service (hereinafter, referred to as "expected period of time te1") is a period of time expected to elapse from when the image processing device 1 receives a reservation for the use of the image processing device 1 from a service providing device 2 to when the image processing device 1 starts acquisition of image data. The expected period of time te1 is previously set for each service providing device 2 and stored in the memory 102. Alternatively, the expected period of time te1 may be calculated by the controller 101 for each service providing device 2 based on the history when the image processing device 1 receives reservations for use. For example, the controller 101 may calculate the expected period of time te1 by calculating the average of elapsed periods of time, each of which is from reception of a reservation for use to start of acquisition of image data, based on the reservations for use received in the past by the image processing device 1.

(8) Eighth Modification

The timing, at which the image processing device 1 notifies the service providing device 2 about the presence of the reservation for the use of the image processing device 1, is not limited to a timing immediately after a reservation for use is received. For example, the image processing device 1 may notify the other service providing device 2 about the presence of a reservation for the use of the image processing device 1 at a timing corresponding to the progress of processing in a cloud service of one service providing device 2, through which the reservation for the use of the image processing device 1 is received. To be specific, the image processing device 1 may notify the other service providing device 2 about the presence of the reservation for the image processing device 1 after the service providing device 2, through which the use of the image processing device 1 is received, starts acquisition of image data. In this case, the image processing device 1 receive the notification about that the acquisition of the image data is started, from the service providing device 2A, and makes a notification about the presence of the reservation for the use of the image processing device 1, in response to the reception of the notification, similarly to the processing shown in FIG. 10.

(9) Ninth Modification

The image processing device 1 may make a notification about the presence of a reservation for the use of the image processing device 1 at a timing corresponding to the expected period of time te1 of the service providing device 2. For example, the image processing device 1 may calculate a period of time by subtracting the expected period of time te1 of the service providing device 2 of the notification target from the expected period of time te1 of the service providing device 2, through which the reservation is received (hereinafter, referred to as "reservation reception period of time ta1"). Then, the image processing device 1 may notify the service providing device 2 of the notification target about the presence of the reservation for the use of the image processing device 1 after the reservation reception period of time ta1 elapses. In this case, the controller 101 calculates the expected period of time te1 of the service providing device 2, in which the image processing device 1 is registered, and stores the calculated value in the RAM. If the expected period of time te1 of the service providing device 2, through which the reservation is received, is shorter than the expected period of time te1 of the service providing device 2 of the notification target (if the reservation reception period of time ta1 is a negative value), the image processing device 1 makes a notification about the presence of the reservation for the use of the image processing device 1 immediately after the reservation reception period of time ta1 is calculated.

Figure 14A:
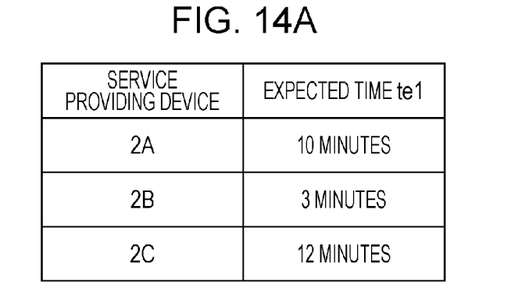
FIGS. 14A and 14B are illustrations showing an example of processing according to a ninth modification.
Figure 14B:
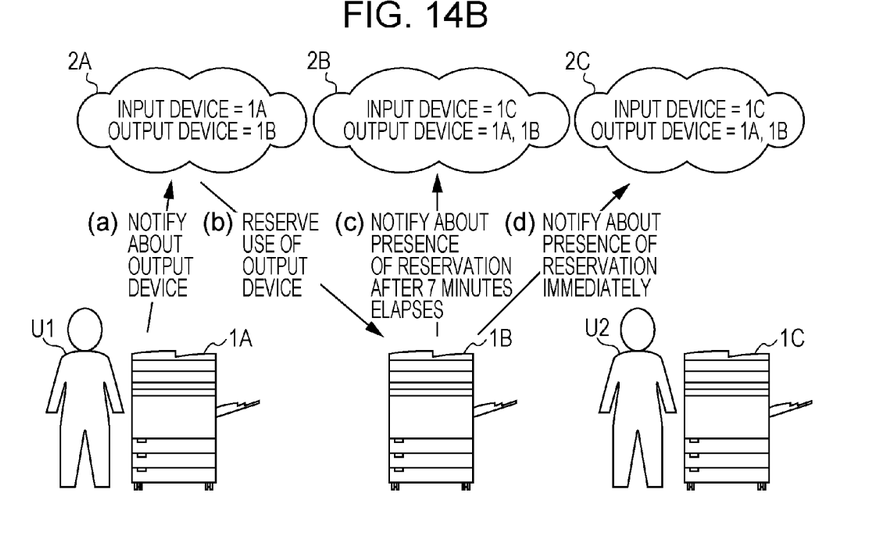

FIGS. 14A and 14B are illustrations showing an example of processing according to a ninth modification. FIG. 14A is an illustration showing an example of an expected period of time te1 of each service providing device 2. In the example shown in FIG. 14A, expected periods of time te1 of the service providing devices 2A, 2B, and 2C are 10 minutes, 3 minutes, and 12 minutes, respectively. FIG. 14B illustrates processing when the image processing device 1B receives a reservation for use by the service providing device 2A ((b) in FIG. 14B), and notifies the service providing devices 2B and 2C about the presence of the reservation for the use of the image processing device 1B ((c) and (d) in FIG. 14B). In the example shown in FIG. 14B, the image processing devices 1A and 1B are registered as the output devices in the service providing device 2C. In the example shown in FIGS. 14A and 14B, a reservation reception period of time ta1 is 7 minutes if the service providing device 2B is notified of the presence of the reservation. Hence, the image processing device 1B notifies the service providing device 2B about the presence of the reservation after 7 minutes elapses since the reservation reception period of time ta1 is calculated (that is, since the reservation for use by the service providing device 2A is received). Also, the reservation reception period of time ta1 is a negative value if the service providing device 2C is notified of the presence of the reservation. Hence, the image processing device 1B notifies the service providing device 2C about the presence of the reservation immediately after the reservation reception period of time ta1 is calculated.

(10) Tenth Modification

The image processing device 1 may make the notification about the presence of the reservation for the use of the image processing device 1 at a timing corresponding to the expected period of time of processing of the image processing device 1 if the reservation is made from the service providing device 2 of the notification target. The expected period of time of the processing of the image processing device 1 (hereinafter, referred to as "expected period of time te2") is a period of time, in which the service providing device 2 is expected to use a function of the image processing device 1. The expected period of time te2 is calculated by the controller 101 for each of the service providing devices 2 based on the history when the function of the image processing device 1 is used by the service providing device 2. For example, the image processing device 1 may calculate a period of time by subtracting the expected period of time te1 and the expected period of time te2 of the service providing device 2 of the notification target from the expected period of time te1 of the service providing device 2, through which the reservation is received (hereinafter, referred to as "reservation reception period of time ta2"). Then, the image processing device 1 may notify the service providing device 2 of the notification target about the presence of the reservation for the use of the image processing device 1 after the reservation reception period of time ta2 elapses. If the reservation reception period of time ta2 is a negative value, the image processing device 1 makes a notification about the presence of the reservation for the use of the image processing device 1 immediately after the reservation reception period of time ta2 is calculated. As a specific example, referring to the example shown in FIGS. 14A and 14B, if the expected period of time te2 of the service providing device 2B is 1 minute, the reservation reception period of time ta2 when the service providing device 2B is notified of the presence of the reservation is 6 minutes. Hence, the image processing device 1B notifies the service providing device 2B about the presence of the reservation after 6 minutes elapses since the reservation reception period of time ta2 is calculated (that is, since the reservation for use by the service providing device 2A is received).

Further, in a tenth modification, if the notification about the presence of the reservation is made, the service providing device 2, through which the reservation is received, may be notified of the absence of the reservation for the use of the image processing device 1 at a timing corresponding to a period of time, in which the service providing device 2 is expected to use the function of the image processing device 1 (hereinafter, referred to as "expected period of time te3"). For example, the image processing device 1 may calculate a period of time by subtracting the expected period of time te1 of the service providing device 2 of the notification target from the sum of the expected period of time te1 and the expected period of time te3 of the service providing device 2, through which the reservation is received (hereinafter, referred to as "reservation overlap period of time tb1"). Then, the image processing device 1 may notify the service providing device 2 of the notification target about the absence of the reservation for the use of the image processing device 1 after the reservation overlap period of time tb1 elapses. If the reservation overlap period of time tb1 is a negative value, the notification about the presence of the reservation may not be made. In this case, the service providing device 2 is not notified of the presence or absence of the reservation. As a specific example, referring to the example shown in FIGS. 14A and 14B, if the expected period of time te3 of the service providing device 2A is 3 minutes, the reservation overlap period of time tb1 when the service providing device 2B is notified of the absence of the reservation is 10 minutes. Hence, the image processing device 1B notifies the service providing device 2B about the absence of the reservation after 10 minutes elapses since the reservation overlap period of time tb1 is calculated (that is, since the reservation for use by the service providing device 2A is received). Also, the reservation overlap period of time tb1 for the service providing device 2C is a negative value. Hence, the image processing device 1B does not notify the service providing device 2C about the presence or absence of the reservation.

(11) Eleventh Modification

The image processing device 1 may receive a reservation for use from plural service providing devices 2. For example, the user U2 may select the image processing device 1B in the selection screen Im2 shown in FIG. 9 and thus the image processing device 1B may receive reservations for use from the service providing devices 2A and 2B. In this case, the image processing device 1, which receives the reservation for use from the plural service providing devices 2, adjusts the times so that the time, at which processing corresponding to the reservation from one service providing device 2, does not overlap the time, at which processing corresponding to the reservation from the other service providing device 2. To be specific, the controller 101 executes the processing, the reservation of which is received first, at the time of the reservation for the processing, and executes the processing, the reservation of which is received later, for a spare period of time of the processing, the reservation of which is received first. The "spare period of time" is a period of time before or after the execution period of time of the processing, the reservation of which is received first, and is a period of time longer than the execution period of time of the processing, the reservation of which is received later. The image processing device 1 specifies the spare period of time, for example, based on data for managing the reservation stored in the RAM (hereinafter, referred to as "reservation management data").

Figure 15:
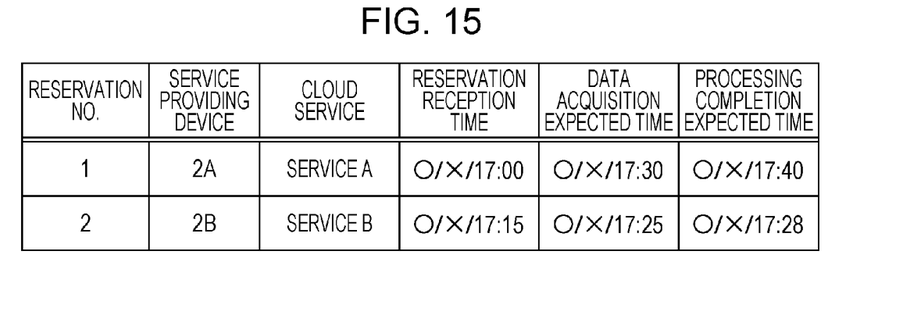
FIG. 15 is an illustration showing reservation management data.

FIG. 15 is an illustration showing reservation management data. FIG. 15 shows reservation management data when the image processing device 1B receives reservations for use from the service providing devices 2A and 2B. The reservation management data includes elements of "reservation number," "service providing device," "cloud service," "reservation reception time," "data acquisition expected time," and "processing completion expected time." "Reservation number" is a number for identifying a reservation from the service providing device 2. "Service providing device" and "cloud service" indicate the service providing device 2, through which the reservation is received, and the cloud service provided by the service providing device 2. "Reservation expected time" is a time at which the image processing device 1 receives the reservation from the service providing device 2. If the reservation management data shown in FIG. 15 is used, the image processing device 1 stores "service providing device," "cloud service," and "reservation reception time" in the RAM or the memory 102 when the image processing device 1 receives the reservation for use from the service providing device 2. "Data acquisition expected time" indicates a time at which the image processing device 1 is expected to start acquisition of image data from the service providing device 2. The data acquisition expected time is calculated by the service providing device 2, which acquires the image data, and the calculated value is transmitted to the image processing device 1, which receives the reservation. The image processing device 1 stores the received data acquisition expected time in the RAM or the memory 102. "Processing completion expected time indicates a time at which the image processing device 1 is expected to complete processing corresponding to the reservation from the service providing device 2 (that is, a time at which the image processing device 1 is expected to end output of the image data acquired from the service providing device 2). The processing completion expected time is calculated by the image processing device 1, which receives the reservation. The image processing device 1 calculates the processing completion expected time, for example, by adding the above-described expected period of time te2 to "data acquisition expected time."

If the spare period of time is specified based on the reservation management data, the controller 101 of the image processing device 1, which receives the reservation, compares the data acquisition expected time for the service providing device 2, through which the reservation is received first (hereinafter, referred to as "time to") with the processing completion expected time for the service providing device 2, through which the reservation is received later (hereinafter, referred to as "time tf"). The controller 101 determines that a spare period of time is present before the execution period of time of the processing, the reservation of which is received first, if the time tf is earlier than the time to. In this case, the controller 101 executes the processing corresponding to the reservation from the service providing device 2, through which the reservation is received later, before the processing corresponding to the reservation from the service providing device 2, through which the reservation is received first. In contrast, the controller 101 determines that a spare period of time is present after the execution period of time of the processing, the reservation of which is received first, if the time tf is at the time to or later. In this case, the controller 101 executes the processing corresponding to the reservation from the service providing device 2, through which the reservation is received later, after the processing corresponding to the reservation from the service providing device 2, through which the reservation is received first. In the example of the reservation management data shown in FIG. 15, the time to is "o/x/17:30," and the time tf is "o/x/17:28." Hence, the controller 101B executes the processing corresponding to the reservation from the service providing device 2B before the processing corresponding to the reservation from the service providing device 2A.

(12) Twelfth Modification

The device, through which a reservation for use is received from the image processing device 1 is not limited to the service providing device 2. The image processing device 1 may receive a reservation for use from, for example, an external device, such as a personal computer, which is connected through a LAN.

(13) Thirteenth Modification

The method of receiving information relating to the use of a function provided by the image processing device 1 is not limited to the method described in the exemplary embodiment. For example, the image processing device 1 may receive information relating to use by making an inquiry (polling) whether the image processing device 1 is selected as the output device or not, to the service providing device 2. For another example, the image processing device 1 may receive information relating to use in response to transmission of an email to the service providing device 2, or input of a command that is determined based on a protocol for communication with the service providing device 2 (for example, a protocol for a chat). For still another example, the image processing device 1 may receive information relating to use from the other image processing device 1 that functions as the input device.

(14) Other Modifications

The function, the reservation for the use of which is received by the image processing device 1, is not limited to the print function of the image processing device 1. The image processing device 1 may receive a reservation for the use of other function.

The information processing device is not limited to the image processing device 1. The information processing device may be a device other than the image processing device 1 as long as the information processing device functions as a client device.

The hardware configurations of the respective devices used in the image processing system are not limited to the configurations shown in FIGS. 4 and 5. Any hardware configuration may be used as long as the respective devices may execute the processing in the respective steps shown in FIG. 7.

In the exemplary embodiment, the programs that are executed by the image processing device 1 and the service providing device 2 may be each provided in a manner stored in a computer readable storage medium, such as a magnetic storage medium (a magnetic tape, a magnetic disk (a hard disk drive (HDD), a flexible disk (FD)), etc.), an optical storage medium (an optical disk (a compact disk (CD), a digital versatile disk (DVD)) etc.), a magneto-optic storage medium, or a semiconductor memory (a flash ROM etc.). Also, the programs may be each downloaded through a network such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device, comprising:
a processor; and
a memory storing computer readable instruction units configured to cause the processor to execute:
   a communication unit configured to communicate with a plurality of service providing devices including a first service providing device and a second service providing device;
   a receiving unit configured to receive information relating to use of a function and a state of another information processing device from the first service providing device; and
   a notification unit configured to notify the second service providing device about the state of the another information processing device, through the communication unit, in response to the reception of the information by the receiving unit;
   wherein the information processing device comprises at least one of a copier, a printer, a scanner and a facsimile device, the another information processing device comprises at least one of another copier, another printer, another scanner and another facsimile device, the first service providing device comprises a first server, and the second service providing device comprises a second server.

2. The information processing device according to claim 1, wherein the notification unit is further configured to notify the second service providing device about progress of processing in a service of the first service providing device after the notification unit makes the notification about the state.

3. The information processing device according to claim 1,
   wherein the information processing device is configured to provide a plurality of functions,
   wherein the receiving unit is configured to receive information relating to use of a function among the plurality of functions, and
   wherein the notification unit is configured to make the notification about the state for the function, the information relating to the use of which is received by the receiving unit.

4. The information processing device according to claim 3, wherein
   the memory configured to store associations each of the plurality of functions and the service providing devices,
   wherein the notification unit is configured to notify the second service providing device corresponding to a particular function about the state of the another information processing apparatus,
   wherein information relating to the use of the particular function is received by the receiving unit.

5. The information processing device according to claim 1, wherein the notification unit does not make the notification about the state if an expected period of time of processing in a service of the first service providing device is a threshold value or shorter.

6. The information processing device according to claim 1, wherein the notification unit is configured to notify the second service providing device about the state of the another information processing device in accordance with progress of the processing in a service of the first service providing device, the information relating to the use of which is received.

7. The information processing device according to claim 1, wherein the notification unit is configured to notify about the state of the another information processing device in accordance with an expected period of time of processing in a service of a service providing device of a notification target.

8. The information processing device according to claim 7, wherein the notification unit is configured to make the notification about the state of the another information processing device in accordance with an expected period of time of processing by the information processing device if the information relating to the use of the function is received for the service providing device of the notification target.

9. The information processing device according to claim 1, further comprising a processing unit configured to execute processing corresponding to the information received by the receiving unit,
   wherein the processing unit processes information received first at a time correspond to the information, and processes information received later at a spare period of time of the processing of the information that was received first.

10. The information processing device according to claim 1, wherein the information relating to use of the function comprises a reservation for use of the function by the another information processing device.

11. The information processing device according to claim 1, wherein the communication unit, the receiving unit and the notification unit are components of the computer readable instruction units.

12. An information processing system, comprising:
an information processing device; and
a plurality of service providing devices including a first service providing device and a second service providing device,
   wherein the information processing device includes a processor and a memory storing first computer readable instruction units configured to cause the processor to execute:
      a first communication unit configured to communicate with the plurality of service providing devices,
      a first receiving unit configured to receive information relating to use of a function, which is provided by the information processing device, and a state of another information processing device from the first service providing device, and
      a notification unit configured to notify the second service providing, device about the state of the another information processing device, through the first communication unit, in response to the reception of the information by the first receiving unit, and
   wherein the second service providing device includes a processor and a memory storing second computer readable instruction units configured to cause the processor to execute:
      a second communication unit configured to communicate with the another information processing device, and a second receiving unit configured to receive the state of the another information processing device notified from the information processing device, through the second communication unit;
   wherein the information processing device comprises at least one of a copier, a printer, a scanner and a facsimile device, the another information processing device comprises at least one of another copier, another printer, another scanner and another facsimile device, the first service providing device comprises a first server, and the second service providing device comprises a second server.

13. The information processing system according to claim 12, wherein the information relating to use of the function comprises a reservation for use of the function by the another information processing device.

14. The information processing system of claim 12, wherein the first communication unit, the first receiving unit and the notification unit are components of the first computer readable instruction units, and
the second communication unit and the second receiving unit are components of the second computer readable instruction units.

15. A non-transitory computer readable medium storing a program causing a computer to execute a process for image processing, the process comprising:
making communication with a plurality of service providing devices including a first service providing device and a second service providing device;
receiving information relating to use of a function, which is provided by an information processing device, and a state of another information processing device from the first service providing device; and
notifying the second service providing device about the state of the another information processing device in response to the reception of the information;
wherein the information processing device comprises at least one of a copier, a printer, a scanner and a facsimile device, the another information processing device comprises at least one of another copier, another printer, another scanner and another facsimile device, the first service providing device comprises a first server, and the second service providing device comprises a second server.

16. An information processing method, comprising:
making, by an information processing device, communication with a plurality of service providing devices including a first service providing device and a second service providing device;
receiving, by the information processing device, information relating to use of a function, which is provided by the information processing device, and a state of another information processing device from the first service providing device; and
notifying, by the information processing device, the second service providing device about the state of the another information processing device in response to the reception of the information;
wherein the information processing device comprises at least one of a copier, a printer, a scanner and a facsimile device, the another information processing device comprises at least one of another copier, another printer, another scanner and another facsimile device, the first service providing device comprises a first server, and the second service providing device comprises a second server.

* * * * *